Feb. 24, 1925.
E. F. POTTER
SIGNALING DEVICE
Filed Feb. 16, 1920
1,527,439
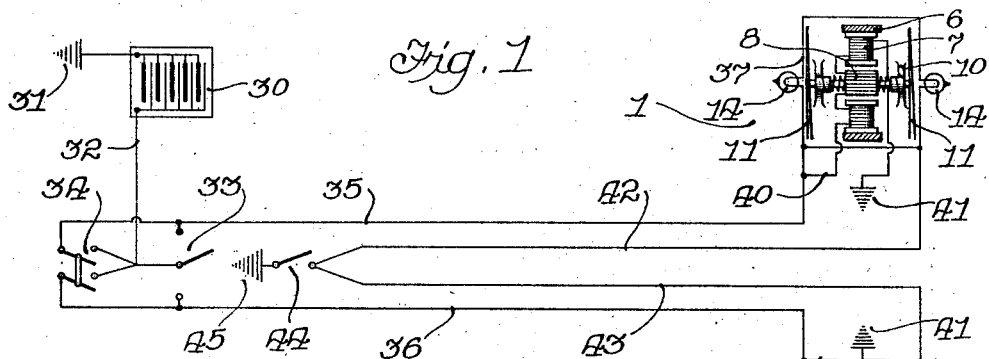
Fig. 1
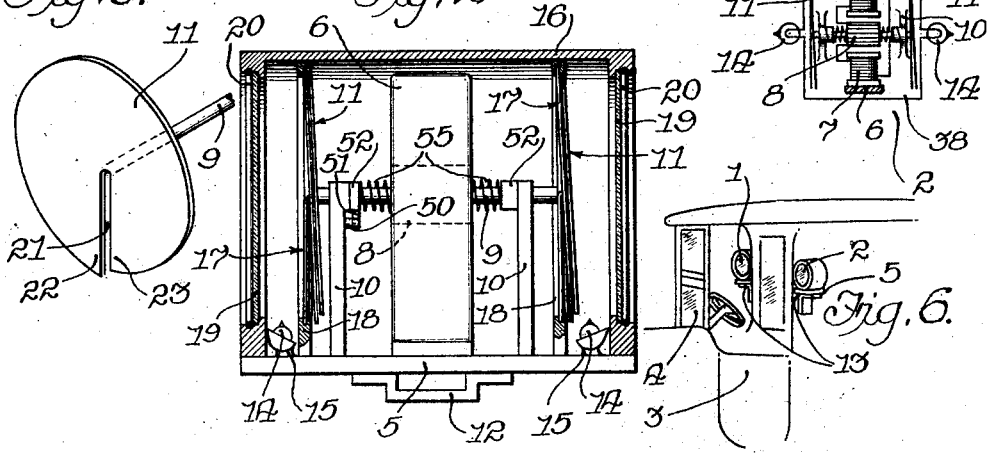
Fig. 3.  Fig. 2.  Fig. 6.
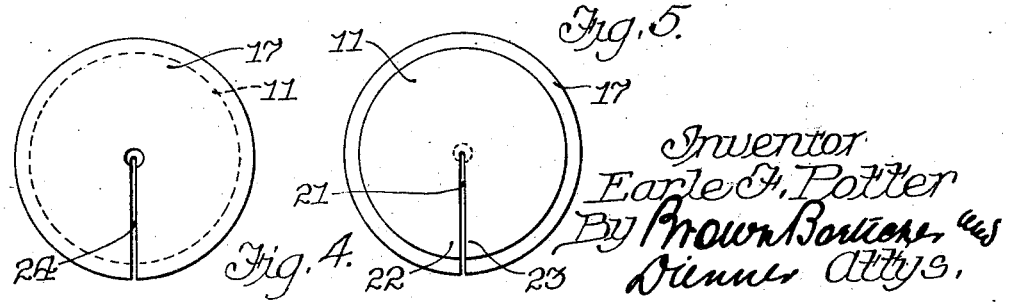
Fig. 5.
Fig. 4.
Inventor
Earle F. Potter
By Brown Borrione
Dunner Attys.

Patented Feb. 24, 1925.

1,527,439

UNITED STATES PATENT OFFICE.

EARLE F. POTTER, OF CHICAGO, ILLINOIS, ASSIGNOR TO THE POTTER SPECIALTIES COMPANY, OF CHICAGO, ILLINOIS, A CORPORATION OF ILLINOIS.

SIGNALING DEVICE.

Application filed February 16, 1920. Serial No. 358,998.

*To all whom it may concern:*

Be it known that I, EARLE F. POTTER, a citizen of the United States, residing at Chicago, in the county of Cook and State of Illinois, have invented a certain new and useful Improvement in Signaling Devices, of which the following is a full, clear, concise, and exact description, reference being had to the accompanying drawings, forming a part of this specification.

My invention relates to signaling devices, and more particularly to an improved traffic signal for automobiles and the like.

While the device of my invention is particularly adapted for use upon motor vehicles and various other conveyances to indicate a change of course, diminution in speed or that a stop is to be made, I do not intend to limit the invention to such use or purpose only.

It has been the custom of vehicle drivers to give notice to others of their intention to stop or to make other changes in the driving of their vehicle to avoid accidents to vehicles, passengers and pedestrians. Inasmuch as these signals require removal of the hand from the operative mechanism of the vehicle, they are objectionable even in the day time. At night such signals are useless because invisible. To give such a signal from an enclosed vehicle is a further difficult problem. The modern congested city traffic demands a simple, quick and positive acting, readily visible signaling device.

I am aware that various signaling devices have been provided heretofore in the art. I have observed that the practicability of such devices generally has not been of a high order, due primarily to the complexity of their construction. In the past all refinements which go to make up an attractive device have been forsaken in overcoming the various problems of proper operation and control. In devices including a plurality of swinging arms or movable pointers, the interference of the various elements and the problem of making the device weatherproof have presented further practical difficulties.

It is an aim of my invention to provide a novel, simple and compact signaling device which may be easily installed, economically maintained, is effective in operation and attractive in appearance.

A further aim of my invention is the provision of improved means for quickly and positively operating the device to give the desired signal or indication to the front as well as to the rear of the vehicle and for thereafter returning the indicating element to normal position.

Other salient features are the provision of a novel system of indicating surfaces and the provision of a novel arrangement whereby the indicating as well as the operating mechanism of the signal is at all times enclosed and thereby rendered weatherproof.

In accordance with the teachings of my invention a pair of signaling devices are suitably arranged one on each side of the automobile or other conveyance. When the vehicle is to be turned to the right the signal on the right hand side of the vehicle is operated by means arranged upon the steering wheel of the vehicle or otherwise readily accessible from the driver's seat to convey such intention to the front as well as to the rear of the vehicle. The signal on the left hand side is operated or displayed when the vehicle is to be turned to the left. To indicate a diminution in speed or that a stop is to made, both of the signaling devices are operated simultaneously to warn other vehicles, passengers and pedestrians of such intention. I provide for illuminating the signal by means operated, simultaneously with the operation thereof, to make the signal clearly visible at night as well as by day. The signaling, as well as the operating mechanism of my improved device is at all times enclosed in a suitable housing and is therefore not subject to adverse weather conditions.

In order that those skilled in the art may be fully acquainted with the nature and scope of the present invention I shall describe a specific embodiment of the invention in connection with the accompanying drawings which form a part of this specification.

In the drawings:

Figure 1 is a diagrammatic view showing the relative positioning of the signaling devices and the switches and electric circuits for operating the same;

Figure 2 is a vertical longitudinal section through an illustrative embodiment of my invention;

Figure 3 is an isometric view of one of the movable indicating surfaces;

Figure 4 is a front elevational or face view of the stationary indicating surface showing the movable indicating surface positioned therebehind;

Figure 5 is a view similar to Figure 4 showing the movable indicating surface positioned in front of the relatively stationary indicating surface; and Figure 6 is a fragmentary perspective view of a motor vehicle showing one arrangement of the signaling devices of my invention in connection therewith.

Referring first to Figures 1 and 6, the signaling devices of my invention are denoted as a whole by the reference numerals 1 and 2, and these may be arranged adjacent the sides of the motor vehicle 3, substantially as shown in Figure 6, or in any other desired manner, as for example on the opposite upright posts of the wind shield 4, or even upon the fenders of the car if so desired.

Each of the devices 1 and 2 comprises a base plate 5 (Figure 2) having a frame 6 mounted thereupon. The frame 6 supports the field coils 7 within which field an armature coil 8 is arranged to rotate. The armature 8 is carried upon a shaft 9 supported adjacent its opposite ends in bearing members 10—10 mounted in an upright position upon the base plate 5. The opposite ends of the shaft 9 project through the upright bearing members 10—10 and carry the rotatable indicating or signaling discs or shutters 11—11 of the device which will be hereinafter more fully described. A channel member 12 secured to the under surface of the base plate 5 forms a universal mounting for securing the entire signaling device to the mounting brackets 13 (Figure 6) the formation or contour of which mounting brackets 13 will depend upon the particular place at which the signaling devices are to be mounted upon the car.

Stationary signaling discs or surfaces 17—17 are mounted in upright position upon the base plate 5, one adjacent each of the opposite ends thereof for co-operation with the rotatable indicating or signaling discs or shutters 11—11. These stationary surfaces 17—17 are preferably mounted in suitable frames 18 or mounting arms projecting upwardly from the base plate 5.

Electric or incandescent lamps 14 are mounted in suitable socket terminals 15 arranged upon the base plate 5 adjacent the outer faces of the stationary signaling or indicating surfaces 17—17. These lamps are preferably provided with suitable shades or reflectors for directing the rays of light upon the signaling discs 17—17.

The entire operating, as well as the signaling mechanism of the device is enclosed in a spun or otherwise suitably fashioned casing or housing 16 mounted upon the base plate 5. The housing 16 makes for a weather, as well as a dust-proof device. The opposite ends of the housing 16 are provided with exposing apertures 19 having glass enclosing panes or other suitable transparent sheets seated therein and held in place as by means of the annular rings 20.

The rotatable indicating shutters 11—11 carried by the shaft 9 are in the nature of discs slotted radially as shown at 21, (Figures 3 and 5). The edges 22 and 23 forming the opposite edges of the slot 21 are offset as clearly shown in Figure 3 and the surface is tapered from one edge to the other giving a helical formation. The relatively stationary signaling surfaces 17—17 are preferably of sufficiently greater size than the shutters 11—11 as will allow for mounting in the frames or mounting arms 18. The surfaces 17—17 are slotted as shown at 24 and tapered from one edge of the slot to the other to provide helical surfaces of substantially the same pitch as the helical surfaces 11—11.

Assume for the purpose of convenient illustration that the normal relation or position of the rotatable discs 11—11 relative the stationary indicating surfaces 17—17 is as shown in Figure 2. In such instance the outer surfaces of the discs 17 at the left or forward end of the devices would be enameled preferably white, while the outer surfaces of the adjacent or co-operating rotatable discs 11 would be enameled preferably red, green or other distinctive color. The outer surfaces of the discs 11 at the right hand or rear end of the devices would be enameled to correspond with the outer surfaces of the discs 17 at the opposite ends of the devices. The outer surfaces of the adjacent or co-operating discs 17 would be enameled similar to the outer surfaces of the discs 11 at the left hand or forward end of the device. It will now be apparent that normally similarly colored discs, preferably white, will be displayed at each of the opposite exposing apertures of each of the devices 1 and 2 (Figure 6). Upon rotation of the shaft 9 the rotatable helical discs 11—11 will be threaded through the stationary indicating surfaces 17—17, positioning the discs 11—11 adjacent the opposite faces of the discs 17—17 and thereby changing the color or character of the discs displayed at the opposite ends of the device. Thus operation of either of the indicating devices 1 and 2 is accomplished by rotating the shaft 9 associated therewith, whereupon discs of similar color or character, (but distinct from the discs normally exposed) will be moved into exposing position at the opposite ends of the device.

Mounted upon the steering wheel of the vehicle or otherwise positioned for convenient access from the driver's seat I provide selective means for controlling the electric circuits to change the relative positioning of either or both of the sets of signaling devices. In the wiring circuit any suitable source of E. M. F. 30 is used, as for example the storage battery with which all motor vehicles are equipped. One terminal of the battery 30 is grounded at 31, as for example through the frame of the vehicle. A conductor 32 leads from the other terminal thereof to a suitable single pole, double throw switch 33 and also to a double pole single throw switch 34. Conductors 35 and 36 lead from the opposite terminals of the switches 33 and 34 to the lamp circuits 37 and 38 respectively whereby the lamps 14 are supplied. Field excitation is supplied from the circuits 35 and 36 through the field coils 7 connected in series through the armature 8 by way of a conductor 40 the opposite end of which is grounded, as shown at 41. The conductors 42 and 43 of the lamp circuits 37 and 38 respectively lead to the common terminal of a suitable switch 44, the other terminal of which switch is grounded as shown at 45.

The operation is as follows: Assume that the signaling devices are in normal indicating position, i. e., the stationary white enameled discs 17 at the left or forward ends thereof are in indicating position at the forward exposure apertures 19 while the rotatable white enameled discs 11 at the rear or right hand ends thereof are in indicating position at the rear exposing apertures 19. Should the driver intend to turn to the right the switch 33 is actuated to close the circuit through the field coils and armature of the signaling device 1 by way of the conductor 35, the opposite end of the circuit thereby completed being grounded at 41. The shaft 9 is thereupon rotated, suitable stops 50 and 51 carried for example by the upright bearing brackets 10—10 and the sleeves 52—52 carried by the shaft 9 limiting such rotation to substantially 360 deg. As heretofore pointed out, rotation of the shaft through 360 deg., threads the rotatable discs 11—11 through the stationary discs 17—17 from the rear to the forward surfaces thereof. (See Figures 4 and 5.) Thus upon substantially 360 deg., rotation of the shaft 9 the red enameled discs 11 at the forward end of the devices will be in indicating position at the forward exposing aperture 19, while the red, (or other suitable color) enameled stationary disc 17 at the rear end of the device will be in indicating position at the rear exposing aperture 19, indicating to the front as well as to the rear, that the driver intends to turn to the right. The signaling discs indicating a change in course or stop, of course, in addition to being of distinguishing colors, may be provided with suitable arrows, words or the like which might assist in signaling the driver's intention as to the subsequent directing of the car.

Should the driver intend to stop or decrease the speed of the vehicle, the switch 34 is actuated to close the circuits through each of the signaling devices 1 and 2 simultaneously, whereupon the colored disc indications, to the front as well as to the rear, on each side of the car, convey the driver's intentions to the public. Upon rotation of the shaft 9 through 360 deg. and opening of the switch, these shafts are returned to normal position by means of suitable coiled springs 55, which coiled springs in addition maintain the outer faces of the sleeves 52 in engagement with the inner faces of the bearing brackets 10—10 at all times. These co-operating faces are inclined (Figure 1) at substantially the same pitch as the helical surfaces of the discs 11—11 and 17—17 and thereby provide in effect cam surfaces whereby frictional engagement of the discs 11 and 17 is effectively prevented. Frictional engagement of these parts would wear the enamel off the indicating surfaces in no time.

Should the driver intend to turn to the left the signaling device 2 (Figure 6) is operated independently of the device 1. When so desired the switch 44 is closed grounding the conductors 42 and 43 leading from the lamp circuits 37 and 38 respectively, whereupon operation of either of the signaling devices simultaneously closes the lamp circuit associated therewith and as a result a flood of light from the bulbs 14 is cast or directed upon the signaling surfaces of the device. By opening the switch 44 the signaling devices can be operated independently of the lamps 14.

The signaling surfaces may be returned to their normal indicating relation electrically if so desired as by any of the reversing arrangements which are well known in the art. For example, the current in the circuit may be reversed in such manner that the polarity of either the armature or field is reversed and the direction of rotation of the shafts 9 changed.

While I have described the invention in connection with the details of a particular embodiment, it is to be understood that this embodiment is merely illustrative and I do not intend thereby to limit the invention to such details as I am aware and contemplate that modifications and changes may be made without departing from the scope of my invention which is set out in the appended claims.

I claim:

1. In a signaling device, a helical member for giving a signaling indication, a second helical member for giving another signaling indication and means for threading one of said members through the other to change the signaling indication given.

2. In a signaling device, a signaling member for giving a signaling indication, a second signaling member for giving another signaling indication, said members being formed to permit threading of one through the other, and means operable to thread one signaling member through the other to change the signaling indication given.

3. In a signaling device, a relatively stationary helical signaling member for giving a signaling indication, a relatively rotatable helical signaling member for giving another signaling indication, and means for rotating the relatively rotatable helical signaling member to thread the same through the relatively stationary helical signaling member into position forward or to the rear of the same to change the signaling indication given.

4. In a signaling device, a helical member for giving a signaling indication, a second helical signaling member, means operable to position said second signaling member forward or to the rear of said first signaling member, said signaling members being in substantial longitudinal or axial alignment at all times.

5. In a signaling device, the combination of a helical signaling member and means for threading said helical signaling member through a second signaling member into indicating position in front of and concealing said second member and into concealed position behind said member to change the signaling indication given.

6. In a signaling device, a housing provided with an exposing opening, a signaling member for display at said opening to give a signaling indication, a rotatable shaft, a helical signaling member carried by said shaft, and means for rotating said shaft to thread the helical signaling member carried thereby through said first signaling member to change the signaling indication at the exposing opening.

7. In a device of the class described, a signaling member for giving a signal, a second signaling member for giving another signal, said members being of helical formation to permit threading of one through the other, and a motor having a shaft carrying one of said members, said shaft being rotatable to thread the signaling member carried thereby through the other signaling member to change the signal given.

8. In a device of the class described, the combination of a helical signaling member, a second member for concealing said first member, said second member being formed to permit threading of said first member therethrough, and means for turning said first member to thread it through said second member into exposed position in front of and into concealed position behind said second member.

9. In a device of the class described, the combination of a signaling member, a second member for concealing said first member, said members being formed to permit threading of one through the other, and means operable to thread one of said members through the other to expose it in front of and conceal it behind said other member.

In witness whereof I hereunto subscribe my name this 3rd day of February, 1920.

EARLE F. POTTER.